United States Patent [19]

Vassalli

[11] 4,388,361

[45] Jun. 14, 1983

[54] ELEMENT FOR THE INSULATION OF THE OUTER WALL OF A BUILDING

[76] Inventor: Elio Vassalli, 6852 Genestrerio, Switzerland

[21] Appl. No.: 221,638

[22] Filed: Dec. 31, 1980

[30] Foreign Application Priority Data

Dec. 31, 1979 [CH] Switzerland ............... 11484/79
Nov. 19, 1980 [CH] Switzerland ............... 8545/80

[51] Int. Cl.³ .................... E04B 2/18; E04C 1/10
[52] U.S. Cl. ........................... 428/192; 52/595; 156/304.5
[58] Field of Search ........... 428/53, 192; 52/315, 52/589, 593, 595, 592; 156/304.1, 304.5

[56] References Cited

U.S. PATENT DOCUMENTS

| | | | |
|---|---|---|---|
| 1,156,753 | 10/1915 | Carey | 52/593 |
| 1,282,090 | 10/1918 | Lemme | 52/589 |
| 1,705,338 | 3/1929 | Playford | 52/248 |
| 1,995,264 | 3/1935 | Mason | 428/192 X |
| 3,386,218 | 6/1968 | Scott | 52/595 X |
| 3,715,417 | 2/1973 | Pope | 428/192 X |
| 3,740,909 | 6/1973 | Stinnes | 52/595 X |
| 4,238,544 | 12/1980 | Mullet | 428/192 X |
| 4,299,069 | 11/1981 | Neumann | 52/593 X |

Primary Examiner—Henry F. Epstein
Attorney, Agent, or Firm—Young & Thompson

[57] ABSTRACT

An insulating element for use in building walls comprises two rigid slabs preferably of brick, and interposed insulating material preferably of expanded polyurethane. The interposed insulation projects out along the periphery of the slabs and is embedded in a complementary recessed part in the insulation of the adjacent element, leaving an interval between the slabs which is filled with mortar in order to unite the slabs. Adjacent elements are pressed against each other during installation in order to reciprocally compress the insulation along the separation plane. The slabs are fed continuously, on edge, in spaced relation, between superposed conveyor belts, thereby to form a tunnel into which the polyurethane is fed and fills by expansion. The slabs are then cut apart by grinding and the insulation is cut along the midline of the slot thus produced, after which the elements are packaged.

5 Claims, 11 Drawing Figures

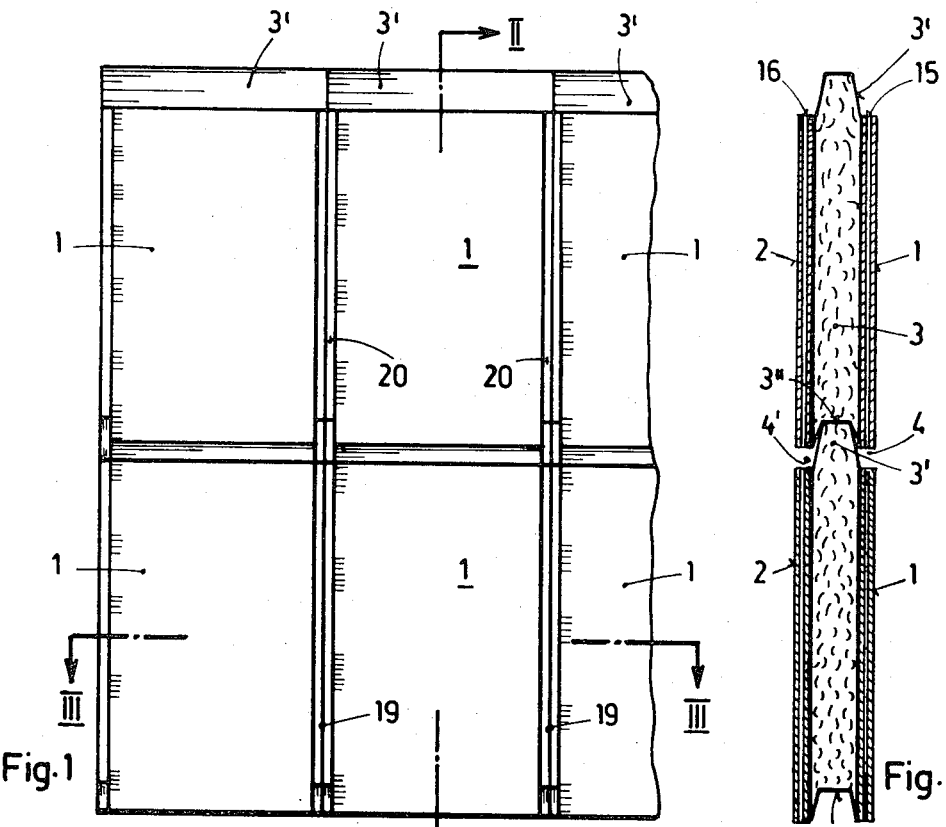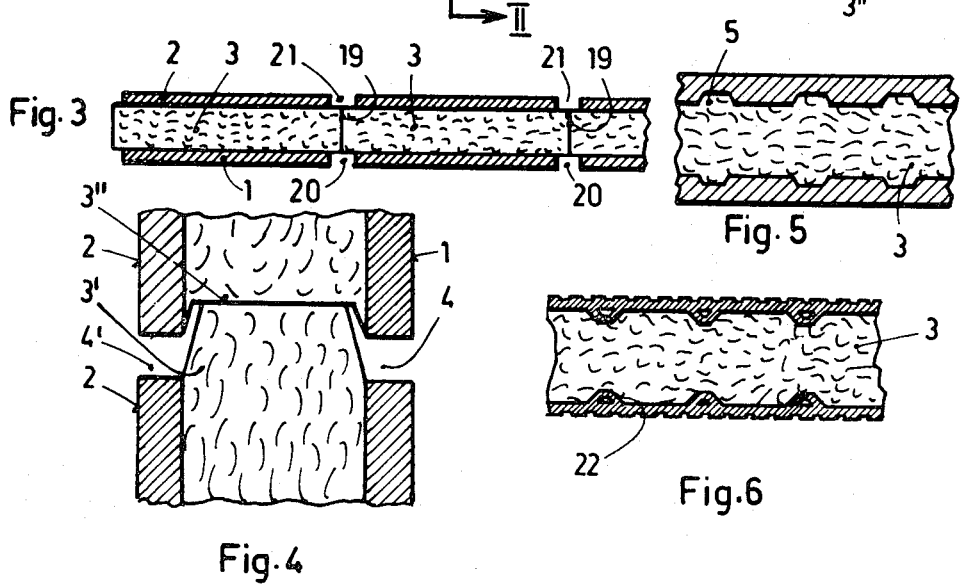

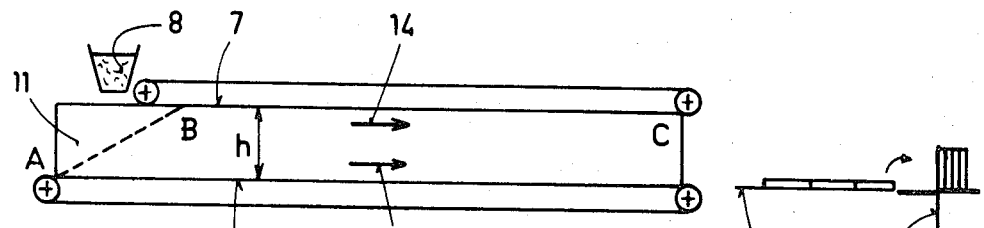
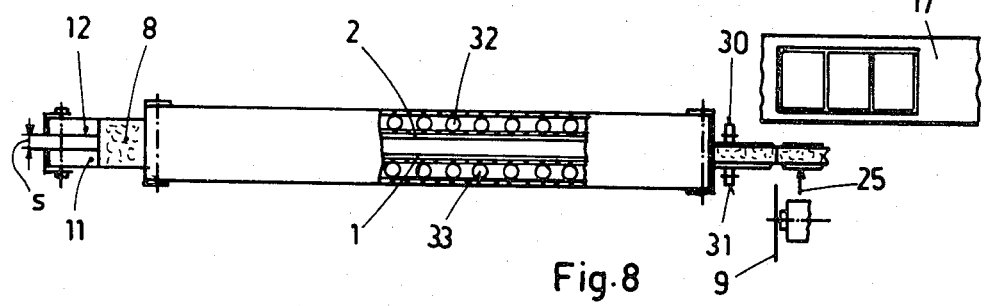
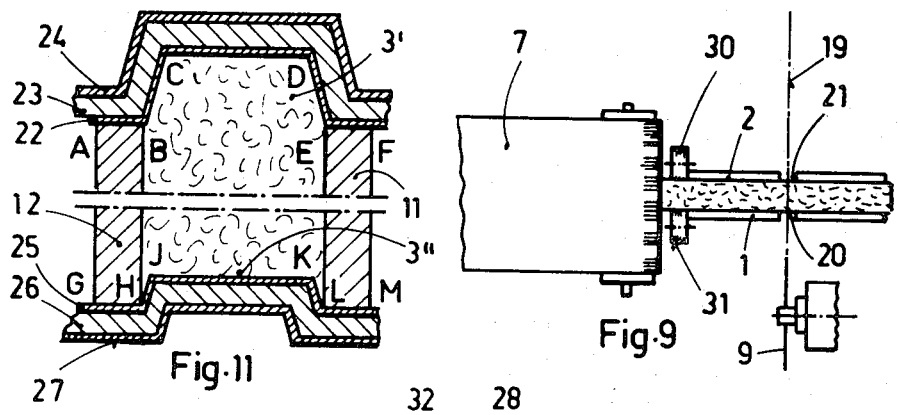
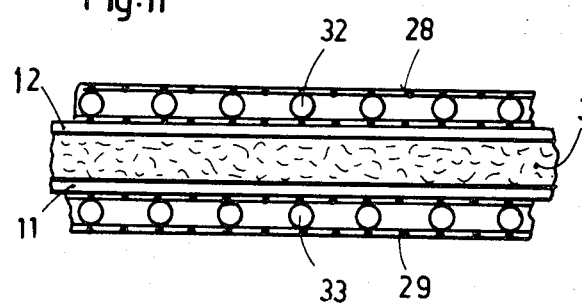

ELEMENT FOR THE INSULATION OF THE OUTER WALL OF A BUILDING

A known present-day practice, for the purpose of conserving energy, is to cover buildings under construction and optionally also those already existing, with insulating coverings which diminish the dispersion of heat to the outside during the winter, and provide a more pleasant climate during the summer.

It is accordingly an object of the present invention to provide such a covering which combines a high insulation coefficient with minimum difficulty of construction, for use either in the construction of new buildings or in those already existing.

To this end, the present invention provides a covering which is characterized by two rigid slabs, one external and one internal, and by insulating material fitted between them which unites them. The insulating material interposed between the two slabs projects from the periphery of the two rigid slabs of the element in such a manner as to leave an interspace between the periphery of the rigid slabs of one element and the periphery of the rigid slabs of the adjacent elements, in order to receive mortar connecting the rigid slabs. The projecting part of the insulating material of one element is adapted to be embedded in the complementary insulating part of the adjacent element, or to be pressed against the projecting part of the adjacent element.

According to a preferred embodiment, the two slabs are of fired brick, hollow or solid, preferably with vertical openings to allow evaporation of water of condensation.

The interposed insulation is preferably polyurethane foam secured to the two slabs.

Another object of the present invention is to provide a process which allows the continuous manufacture of elements according to the invention, and to provide equipment for practicing the process.

The apparatus used to practice the process comprises two parallel superposed conveyor belts. Two slabs of the same width as the thickness of the elements are supported on edge on the lower conveyor belt at a spacing corresponding to the thickness of the insulation to be made. A hopper is provided, containing the material which is to be expanded, particularly expansible polyurethane. Pressure rollers are provided on the outer sides of the two slabs for the purpose of resisting the pressure due to the expansion of the insulation between the two conveyor belts. Two opposed mills are situated at the discharge from the two conveyor belts to mill two opposite vertical channels in said two slabs. A cutting disk cuts the insulation along the midline of said channels. A packaging device mounted at the side of or in proximity with the lower conveyor belt is preceded by an overturning mechanism and a support for the slabs to be packaged.

In the accompanying drawings:

FIG. 1 is a partial frontal view of a covering formed of elements according to the present invention;

FIG. 2 is a transverse cross section along the line II—II in FIG. 1;

FIG. 3 is a cross section on the line III—III in FIG. 1;

FIG. 4 is a detail of FIG. 2 on a larger scale;

FIG. 5 is a variation, still in transverse cross section, wherein the slabs have internal channelling for improved adherence of the insulation;

FIG. 6 is a view similar to FIG. 5 but showing another variation;

FIG. 7 is a diagrammatic side view of the equipment for practicing the process according to the present invention;

FIG. 8 is a top plan view of FIG. 7;

FIGS. 9 and 10 show two details of FIG. 8 on a larger scale; and

FIG. 11 shows, in transverse cross section, the device which imparts the preferred shape to the insulating parts which are embedded in each other.

With reference to FIGS. 1, 2, 3, the element according to the present invention, which is applied with others of the same sort preferably on the outside of the outer supporting walls of a building under construction or already constructed, is formed of two rigid slabs 1 and 2, preferably of fired brick or terra cotta, one mounted on the outside of the wall and the other on the inside.

The intermediate space 3 is filled with insulating material, preferably of expanded polyurethane, which unites tightly to the two slabs.

The adherence can be promoted by channelling 5 (FIG. 5) or by protrusions 22 (FIG. 6) which can have any shape.

The insides of the slabs can be hollow with vertical openings 15 and 16 (FIG. 2) for the evaporation of condensation.

At the top and bottom ends 3' and 3" (FIGS. 2 and 4), the insulation 3 is shaped in such a manner as to allow fitting together of the panels, leaving an interspace 4 and 4' (FIG. 4) between adjacent slabs, which is filled with cement mortar capable of connecting the slabs.

In this manner, the insulating stratum is continuous and the insulation coefficient therefore is constant even at the junction points.

The vertical edges 20 on the contrary (FIGS. 1 and 3) are provided with channels 20, 21 which have the effect of spacing the slabs 1 and 2, leaving an interspace into which the insulation fits, abutting along the median plane 19.

Thus it is possible, during mounting, to bring together two adjacent elements in such a manner that the insulation fitted therein and coming together at channels 20 and 21 is therefore compressed along the median plane 19, assuring perfect insulation even without embedding one element in the other.

The channels 20, 21 are in this case also filled with mortar which unites slabs 1 and 2 of adjacent elements.

In order to be able to manufacture continuously the elements according to the invention, the apparatus is provided as illustrated in FIGS. 7, 8, 9, 10. It comprises a lower conveyor belt 6 whose upper run is movable in the direction of arrow 13 and an upper conveyor belt 7, mounted parallel to the first, whose lower run is movable in the direction 14.

The distance "h" between the two conveyor belts corresponds to the width of slabs 1 and 2 of each element.

For the manufacture of the elements, one preceeds as follows:

on the lower conveyor belt 6 are loaded two continuous slabs of brick or tile 11 and 12, of "h" width equal to that of elements 1 and 2 to be produced and arranged at a spacing corresponding to the thickness "s" (FIG. 8) of insulation 3 between the slabs.

The material that forms the insulation drops from the hopper 8, not yet expanded, and in this particular case is polyurethane with ingredients therein capable of making it expand. Such compositions are entirely conventional and so need not be further described.

The expansion initiated in the passage A-B is completed in the passage B-C creating a strong pressure against the walls of slabs 11 and 12.

Side rollers 32 and 33 are provided (FIGS. 8 and 10) to contain said pressure, and, in collaboration with the chains 28 and 29, press on slabs 11 and 12, resisting the internal pressure of the resin in expansion.

Along the aforementioned passage B-C, adjacent the upper part of the two slabs, where the projecting part 3' of the insulation is to be formed, a rigid profiled band 24 is formed in the shape shown in FIG. 11, and a stratum of soft elastic material such as soft rubber 23 and a sheet of polyvinyl chloride 22 which prevents the adherence of the expanded polyurethane 3' to stratum 23, are provided.

In this manner, the profile A-B-C-D-E-F is therefore of exactly predetermined shape when the two slabs 11 and 12 are discharged from conveyor belts 6–7.

Similarly, the bottom part of the two slabs 11 and 12 is profiled in a manner to complement 3" by means of a rigid profile 27, a stratum of elastic material such as soft rubber 26 and a polyvinyl chloride sheet 25 in order to prevent the sticking of the resin.

The profiling of the complementary part 3" is thus in perfect correspondence with the sections G-H-I-K-L-M, that is to say, exactly complementary with respect to the top part 3'.

At the discharge from the two conveyor belts 6, 7 are found two vertically moving mills 30, 31, which grind the channel 20, 21 (FIG. 3) in the two slabs, which separate the slabs from those of the adjacent element.

Thereafter, the cutting disk, 9 cuts the insulation interposed between the two slabs exactly in the middle of the channels 20, 21, along median plane 19 (FIG. 3).

At this point a thrust element (not shown) thrusts the finished element in the direction of arrow 25, onto a conveyor belt 17 which includes a packaging device, mounted to the side of or in proximity with the lower conveyor belt 6.

An upending mechanism 18 and a support for the slabs to be packaged, complete the apparatus.

It is obvious that the form of the various component parts of the apparatus may be varied and that any mechanism may be replaced by others of known type, without exceeding the scope of protection of the invention.

What is claimed is:

1. Element for insulation of the external walls of a building, comprising two rigid slabs, and expanded polyurethane insulating material between the slabs which unites the slabs; the insulating material between the two slabs projecting out from between both of the two rigid slabs of the element along one edge of the element and being recessed between both of the two rigid slabs of the element along the opposite edge of the element in such a manner as to leave an interspace on each side of the element between the periphery of the rigid slabs of one element and the periphery of the rigid slabs of the adjacent elements when the insulating material of said one element abuts the insulating material of said adjacent elements, so as to receive mortar to connect the rigid slabs together, said insulating material being laterally outwardly exposed to said mortar in said interspace.

2. Element as in claim 1, in which the two slabs are of fired brick.

3. Element as in claim 1, in which at least one of the slabs is open on the inside, with vertical openings to allow for evaporation of moisture of condensation.

4. Element as in claim 1, in which each slab has cutouts on the inside to promote its anchorage with the insulating material.

5. Element as in claim 1, which is rectangular and has top and bottom edges and vertical side edges, said insulating material projecting beyond said rigid slabs along one of said top and bottom edges and being recessed between said slabs along the other of said top and bottom edges to form horizontal tongue and groove connections between adjacent said elements vertically aligned, said insulating material projecting out from between both of the two rigid slabs along each of said vertical side edges to form butt joints between the insulating material of horizontally aligned said elements.

* * * * *